United States Patent Office 2,873,300
Patented Feb. 10, 1959

2,873,300

SELECTIVE SULFONATION PROCEDURE FOR SEPARATING A 1,3,5 - TRIALKYLBENZENE FROM BENZENE HYDROCARBONS

Ben Bennett Corson and Louis H. Schwartzman, Pittsburgh, Pa., assignors to Koppers Company, Inc., a corporation of Delaware No Drawing. Application February 24, 1956
Serial No. 567,484

7 Claims. (Cl. 260—674)

This invention relates to the separation of a 1,3,5-trialkylbenzene from mixtures with other alkylbenzenes. More particularly, it relates to a selective sulfonation procedure in which a 1,3,5-trialkylbenzene is separated in purified form from alkylbenzene mixtures containing one or more other trialkylbenzenes, and/or dialkylbenzenes, and/or monoalkylbenzenes, in which the other alkylbenzenes are sulfonated, and an unsulfonated raffinate consisting of substantially pure 1,3,5-trialkylbenzene is separated from the sulfonation medium.

It has now been discovered that when a mixture of alkylbenzenes containing a 1,3,5-trialkylbenzene, together with one or more other alkylbenzenes having up to three alkyl substituents is subjected to sulfonation with a stoichiometric excess of concentrated sulfuric acid over that needed to sulfonate the other alkylbenzenes and up to about equimolar proportions, based on total hydrocarbon, sulfonation of said other hydrocarbons, hereinafter called "impurities," takes place to the substantial exclusion of the 1,3,5-trialkylbenzene. Any 1,3,5-trialkylbenzene can, accordingly, be separated as a raffinate phase from such impurities as indicated above, provided that the 1,3,5-trialkylbenzene contains only primary and/or secondary alkyl radicals. Tertiary-alkyl radicals are removed under reaction conditions and, therefore, 1,3,5-trialkylbenzenes containing one or more tertiary-alkyl radicals cannot be separated from other alkylbenzenes by our process.

The selective sulfonation procedure utilizes a concentrated sulfuric acid containing about 94%–96% of $H_2SO_4$. Within the scope of this invention it has been determined that a minimum of about 1.9 moles of concentrated sulfuric acid per mole of impurity and up to about 1 mole of concentrated sulfuric acid per mole of total hydrocarbon is required to obtain a 1,3,5-trialkylbenzene raffinate ranging in purity from about 90% to 100% when a preferred sulfonation temperature range of from about 110° C. to about 140° C. is used. Within such preferred sulfonation temperature range, the molar ratio of $H_2SO_4$ to 1,3,5-trialkylbenzene lies between about 0.3 and about 1.9. Advantageously, a sulfonation temperature ranging from about 50° C. to about 200° C. can be used. Such temperatures of sulfonation outside the preferred range of 110° C. to about 140° C. require a longer reaction time within the range 50° C. to 110° C. and a shorter reaction time within the range 110° C. to 200° C.

The recovery and purity of 1,3,5-trialkylbenzene suffer when less than about 1.9 moles of concentrated sulfuric acid per mole of impurity is used. Greater amounts of concentrated sulfuric acid than equimolar proportions, based on total hydrocarbon, result in sulfonation and decreased yield of the 1,3,5-trialkylbenzenes, as in Example 1, runs 3 and 8.

The selective sulfonation procedure separates the indicated 1,3,5-trialkylbenzenes from any other impurities having up to three alkyl substituents, whether primary- and/or secondary- and/or tertiary-alkyl. The sulfonated products, preponderantly monosulfonates, can be recovered and used.

The following examples are an illustration of, and not in limitation of, this invention, which is defined in the claims. The various alkylbenzene contents are determined by infrared spectrometry.

EXAMPLE 1

*Separation of ethyldimethylbenzenes by selective sulfonation*

| Run | Hydrocarbon | | | | Sulfuric Acid | | | | Hrs. | T °C. | Recovery of 1 ethyl 3,5-dimethylbenzene | |
|---|---|---|---|---|---|---|---|---|---|---|---|---|
| | Total Moles | 1 ethyl 3,5-dimethyl | 1 ethyl 2,4-dimethyl | 1 ethyl 2,5-dimethyl | Total Moles | m. $H_2SO_4$ / m. HC* | m. 1 ethyl 3-5 dimethylbenzene | m. $H_2SO_4$ / m. Impurities | | | Percent Yield | Percent Purity |
| 1 | 1.0 | 77 | 9 | 10 | 1.0 | 1.0 | 1.3 | 4.3 | 1.0 | 110 | 93 | 99 |
| 2 | 1.0 | 77 | 9 | 10 | 0.25 | 0.25 | 0.32 | 1.1 | 1.0 | 140 | 93 | 83 |
| 3 | 1.0 | 73 | 10 | 12 | 2.3 | 2.3 | 3.2 | 8.5 | 1.8 | 110 | 10 | 99 |
| 4 | 1.0 | 73 | 10 | 12 | 0.52 | 0.52 | 0.7 | 1.9 | 2.0 | 140 | 99 | 90 |
| 5 | 1.0 | 65 | 28 | 7 | 1.0 | 1.0 | 1.5 | 2.9 | 1.0 | 110 | 95 | 97 |
| 6 | 1.0 | 65 | 28 | 7 | 1.0 | 1.0 | 1.5 | 2.9 | 1.0 | 140 | 95 | 95 |
| 7 | .655 | 65 | 22 | 13 | .655 | 1.0 | 1.5 | 2.9 | 4.0 | 110 | 96 | 93 |
| 8 | 0.45 | 58 | 26 | 15 | 0.5 | 1.1 | 1.9 | 2.6 | 2.0 | 110 | 66 | 100 |

*HC=hydrocarbon.

The hydrocarbon mixture is stirred at 110° C. while the concentrated sulfuric acid is gradually added. The reaction mixture is then stirred for an additional time of about one to two hours. The acid layer is separated and the raffinate layer is washed with water. The dried raffinate is purified 1,3,5-dimethylethylbenzene.

Mixtures in which equimolar amounts of toluene, mixed xylenes, 1,2,3- and 1,2,4-trimethylbenzene, 1-isopropyl 2,4-dimethylbenzene and 1-isopropyl 2,5-dimethylbenzene are substituted for the 1-ethyl 2,4-dimethylbenzene and 1-ethyl 2,5-dimethylbenzene give substantially similar recoveries of 1-ethyl 3,5-dimethylbenzene.

EXAMPLE 2

*Separation of $C_9$-aromatic hydrocarbon mixture by selective sulfonation*

[Hydrocarbon charge—77% mesitylene [a], 9% pseudocumene [b], 3% hemimellitene [c], and 10% ethyltoluenes.]

| m. HC | $\frac{m.\ H_2SO_4}{m.\ HC}$ | m. $H_2SO_4$ | $\frac{m.\ H_2SO_4}{m.\ Mesitylene}$ | T °C. | Hrs. | Mesitylene Recovery | |
|---|---|---|---|---|---|---|---|
| | | | | | | Yield, percent | Purity, percent |
| 1 | 1 | 1 | 1.3 | 110 | 2 | 95 | 100 |
| 1 | 1 | 1 | 1.3 | 110 | 7 | 90 | 100 |

[a] 1,3,5-trimethylbenzene.
[b] 1,2,4-trimethylbenzene.
[c] 1,2,3-trimethylbenzene.

When 1-isopropyl 2,4-dimethylbenzene and 1-isopropyl 2,5-dimethylbenzene are substituted in equimolar amount for the pseudocumene and hemimellitene above, equally high recoveries of pure mesitylene are obtained.

EXAMPLE 3

*Separation of isopropyldimethylbenzenes by selective sulfonation*

[Hydrocarbon charge—75% 1,3,5-IPOMB [1], 10% 1,2,4-IPOMB, and 15% 1,2,5-IPOMB.]

| m. HC | $\frac{m.\ H_2SO_4}{m.\ HC}$ | $H_2SO_4$, m. | $\frac{m.\ H_2SO_4}{m.\ 1,3,5-IPOMB}$ | T °C. | Hrs. | 1,3,5-IPOMB | |
|---|---|---|---|---|---|---|---|
| | | | | | | Yield, percent | Purity, percent |
| 1 | 1 | 1 | 1.3 | 110 | 2 | 96 | 100 |
| 1 | 1 | 1 | 1.3 | 110 | 4 | 93 | 100 |

[1] IPOMB-isopropyldimethylbenzene.

The procedure of Example 1 is repeated with the above-indicated results.

When toluene, 1-ethyl 2,4-dimethylbenzene and 1-ethyl 2,5 - dimethylbenzene are substituted in equimolar amount for the above-indicated 1-isopropyl 2,4-dimethylbenzene and 1-isopropyl 2,5-dimethylbenzene respectively, substantially equivalent recoveries of 1-isopropyl 3,5-dimethylbenzene are obtained.

EXAMPLE 4

Concentrated sulfuric acid (96%, 150 lbs.) is added over one hour to a stirred mixture of isomeric ethyl xylenes (190.4 lbs., containing 65.2% 1-ethyl 3,5-dimethylbenzene, 21.1% 1-ethyl 2,4-dimethylbenzene, 11.8% 1-ethyl 2,5-dimethylbenzene, and 1.1% 1-ethyl 2,6-dimethylbenzene) kept at 110° C. The mixture is stirred at 110° C. for an additional three hours and then cooled to 25° C. The acid layer is separated. The organic layer is washed for two minutes with 120 lbs. of water and separated. This process is repeated with 83 lbs. of water and then with 83 lbs. of a 1.2% aqueous sodium bicarbonate solution. After drying over 4 lbs. of Drierite, the organic layer (104 lbs., 85% recovery) contains 93% 1-ethyl 3,5-dimethylbenzene. Distillation raises the purity to 99% 1-ethyl 3,5-dimethylbenzene; B. P. 183–184° C. An additional 11% yield of 1-ethyl 3,5-dimethylbenzene is obtained either by quenching (by diluting the acid layer with water) or by extracting the acid layer with ether.

When unsymmetric diisopropylmethylbenzenes and unsymmetric diethylmethylbenzenes or unsymmetric triethylbenzenes are substituted in equimolar amounts for the unsymmetric ethylxylenes above, equally advantageous results are obtained.

What is claimed is:

1. In a selective sulfonation process for separating a 1,3,5-trialkylbenzene from alkylbenzene mixtures containing other alkylbenzenes having up to three alkyl substituents, the steps which include reacting said hydrocarbon mixture at about 50° C.–200° C. with concentrated sulfuric acid containing from about 94 to 96% of sulfuric acid for a time sufficient and in amount at least sufficient to sulfonate said other alkylbenzenes and up to substantially equimolar proportions, based on moles of total hydrocarbon, and separating a raffinate 1,3,5-trialkylbenzene from the reaction medium, said 1,3,5-trialkylbenzene being free of tertiary-alkyl substituents.

2. In a selective sulfonation process for separating a 1,3,5-trialkylbenzene from alkylbenzene mixtures containing other alkylbenzenes having up to three alkyl substituents, the steps which include reacting said hydrocarbon mixture at about 110° C.–140° C. with concentrated sulfuric acid containing from about 94 to 96% of sulfuric acid for a time sufficient and in amount at least sufficient to sulfonate said other alkylbenzenes and up to substantially equimolar proportions, based on moles of total hydrocarbon, and separating a raffinate 1,3,5-trialkylbenzene from the reaction medium, said 1,3,5-trialkylbenzene being free of tertiary-alkyl substituents.

3. In a selective sulfonation process for separating a 1,3,5-trialkylbenzene from alkylbenzene mixtures containing other alkylbenzenes having up to three alkyl substituents, the steps which include reacting said hydrocarbon mixture at a temperature of about 110° C.–140° C. with a substantially equimolar amount of concentrated sulfuric acid containing from about 94 to 96% of sulfuric acid, based on moles of total hydrocarbon, for a time sufficient to sulfonate said other alkylbenzenes, and separating a raffinate 1,3,5-trialkylbenzene from the reaction medium, said 1,3,5-trialkylbenzene being free of tertiary-alkyl substituents.

4. A selective sulfonation process for separating 1-ethyl 3,5-dimethylbenzene from alkylbenzene mixtures containing 1-ethyl 2,4-dimethylbenzene and 1-ethyl 2,5-dimethylbenzene which includes the steps of reacting said hydrocarbon mixture at about 110° C.–140° C. with a substantially equimolar proportion of concentrated sulfuric acid containing from about 94 to 96% of sulfuric acid, based on moles of total hydrocarbon, for a time sufficient to sulfonate the other alkylbenzenes in said mixture and separating and recovering a raffinate 1-ethyl 3,5-dimethylbenzene.

5. A selective sulfonation process for separating 1,3,5-trimethylbenzene from alkylbenzene mixtures containing 1,2,3- and 1,2,4-trimethylbenzene and ethyltoluenes which includes the steps of reacting said hydrocarbon mixture at about 110° C. with a substantially equimolar proportion of concentrated sulfuric acid containing from about 94 to 96% of sulfuric acid, based on moles of total hydrocarbon, for a time sufficient to sulfonate the other alkylbenzenes in said mixture and separating and recovering a raffinate 1,3,5-trimethylbenzene.

6. A selective sulfonation process for separating 1-isopropyl 3,5-dimethylbenzene from alkylbenzene mixtures containing 1-isopropyl 2,4-dimethylbenzene and 1-isopropyl 2,5-dimethylbenzene which includes the steps of reacting said hydrocarbon mixture at about 110° C. with a substantially equimolar proportion of concentrated sulfuric acid containing from about 94 to 96% of sulfuric acid, based on moles of total hydrocarbon, for a time sufficient to sulfonate the other alkylbenzenes in said mixture and separating and recovering a raffinate 1-isopropyl 3,5-dimethylbenzene.

7. A selective sulfonation process for separating 1-ethyl 3,5-dimethylbenzene from alkylbenzene mixtures containing 1-ethyl 2,4-dimethylbenzene, 1-ethyl 2,5-dimethylbenzene and 1-ethyl 2,6-dimethylbenzene which includes the steps of reacting said hydrocarbon mixture at about 110° C. with a substantially equimolar proportion of concentrated sulfuric acid containing from about 94 to 96% of sulfuric acid, based on moles of total hydrocarbon, for a time sufficient to sulfonate the other alkylbenzenes in said mixture and separating and recovering a raffinate 1-ethyl 3,5-dimethylbenzene.

References Cited in the file of this patent

FOREIGN PATENTS 594,983     Great Britain _ _ _ _ _ _ _ _ _ _ _ Nov. 24, 1947

OTHER REFERENCES

Armstrong et al.: J. Chem. Soc. (1884), pages 148–153, page 151 only needed.

Mair et al.: J. Res. Nat. Bur. Standards, vol. 11, pages 665–680 (1933), page 676 only needed.

UNITED STATES PATENT OFFICE
CERTIFICATE OF CORRECTION

February 10, 1959

Patent No. 2,873,300

Ben Bennett Corson et al.

It is hereby certified that error appears in the printed specification of the above numbered patent requiring correction and that the said Letters Patent should read as corrected below.

Columns 1 and 2, Example 1, heading to eighth column, for $$\frac{m.}{1 \text{ ethyl } 3\text{-}5} \quad \text{read} \quad \frac{m. \ H_2SO_4}{m. \ 1 \text{ ethyl } 3,5\text{-}}$$
dimethylbenzene   dimethylbenzene column 3, line 63, for "B. P." read -- b. p. --.

Signed and sealed this 2nd day of June 1959.

(SEAL)
Attest:
KARL H. AXLINE
Attesting Officer

ROBERT C. WATSON
Commissioner of Patents